United States Patent [19]

Dotrong et al.

[11] Patent Number: 5,233,017
[45] Date of Patent: Aug. 3, 1993

[54] BENZOBISTHIAZOLE POLYMERS WITH THIOPHENE MOIETIES

[75] Inventors: My Dotrong; Robert C. Evers, both of Dayton; Ronald C. Tomlinson, Maineville; Mark Sinsky, Akron, all of Ohio

[73] Assignee: The United States of America as represented by the Secretary of the Air Force, Washington, D.C.

[21] Appl. No.: 854,731

[22] Filed: Mar. 23, 1992

[51] Int. Cl.$^5$ ................................................. C08K 3/32
[52] U.S. Cl. .................................. 528/332; 528/337; 548/151
[58] Field of Search ................. 548/151; 528/332, 337

[56] References Cited

U.S. PATENT DOCUMENTS 4,533,693  8/1985  Wolfe et al. .................... 528/183
4,939,235  7/1990  Harvey et al. .................. 528/337

FOREIGN PATENT DOCUMENTS 3179880  7/1988  Japan .

OTHER PUBLICATIONS

Polymer Preprints 1991, vol. 32(1), pp. 85–86.
Chemical Abstracts vol. 115 No. 18, Abst. No. 184057 (1991).

Primary Examiner—Joseph Paul Brust
Assistant Examiner—Mary Susan H. Gabilan
Attorney, Agent, or Firm—Charles E. Bricker; Donald J. Singer

[57] ABSTRACT

Benzobisthiazole polymers with thiophene moieties having repeating units of the formula:

$$-Bt-(-Tp-)_n-$$

wherein Bt is

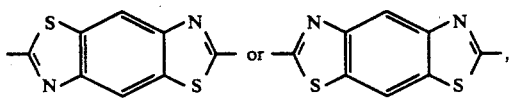

Tp is

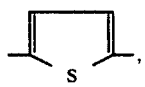

and n has a value of 1 to 3.

3 Claims, No Drawings

BENZOBISTHIAZOLE POLYMERS WITH THIOPHENE MOIETIES

RIGHTS OF THE GOVERNMENT

The invention described herein may be manufactured and used by or for the Government of the United States for all governmental purposes without the payment of any royalty.

BACKGROUND OF THE INVENTION

This invention relates to benzobisthiazole polymers with thiophene moieties.

In recent years, there has been considerable interest in organic pi-electron conjugated polymers as nonlinear optical (NLO) materials. In addition to potentially high third-order NLO properties with very short response times, these organic polymers offer the flexibility for molecular modification leading to the requisite processibility into various NLO-application forms with high mechanical, thermal and environmental stabilities. Theoretical calculations and experimental measurements indicate that the length and electron density of the pi-electron conjugation contribute substantially to the third-order NLO optical susceptibility, chi$^{(3)}$, of aromatic heterocyclic polymers.

High molecular weight rigid-rod poly(p-phenylenebenzobisthiazole) (PBT) can be obtained through the polycondensation of a diaminobenzenedithiol, e.g., 2,5-diamino-1,4-benzenedithiol dihydrochloride (DABDT), with terephthalic acid or terephthaloyl chloride in polyphosphoric acid (PPA). The PBT can be processed from PPA into fibers and films with outstanding mechanical properties and thermooxidative stability. Because of the highly delocalized pi-electron system along its backbone, PBT has been investigated as a promising third-order NLO material. PBT film extruded from PPA exhibits an unusually high chi$^{(3)}$ of $10^{-11}$ esu and a very short response time ($\approx 500$ femtoseconds). In contrast, GaAs, generally considered to be one of the best inorganic NLO materials, has a response time of about 1 picosecond.

Accordingly, it is an object of this invention to provide novel benzobisthiazole polymers.

Other objects and advantages of the invention will be apparent to those skilled in the art.

SUMMARY OF THE INVENTION

In accordance with the present invention there are provided benzobisthiazole polymers with thiophene moieties having repeating units of the formula:

—Bt—(—Tp—)$_n$— wherein Bt is

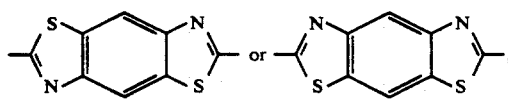

Tp is

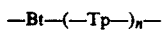

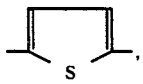

and n has a value of 1 to 3.

DETAILED DESCRIPTION OF THE INVENTION

The polymers of the present invention are prepared by the polycondensation in polyphosphoric acid (PPA) of 2,5-diamino-1,4-benzenedithiol dihydrochloride or 2,4-diamino-1,5-benzenedithiol dihydrochloride with thiophene-2,5-dicarboxylic acid, 2,2'-bithiophene-5,5'-dicarboxylic acid, or 2,2':5',2''-terthiophene-5,5''-dicarboxylic acid, or their corresponding diacid halides.

The polymers of this invention are prepared according to the following general reactions:

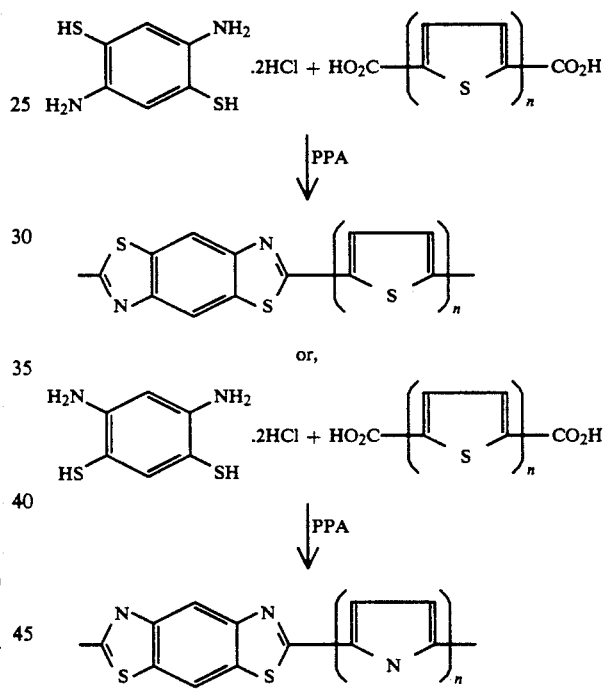

In carrying out the reaction, the diamino monomer is initially dehydrochlorinated. This is accomplished by mixing the diamino monomer and the mono-, di- or tri-thiophene dicarboxylic acid or the corresponding carboxylic acid halide with polyphosphoric acid and heating the mixture under an inert gas atmosphere at a temperature of about 40° to 100° C. for about 6 to 24 hours. A slight excess of one of the monomers may be used.

Following dehydrochlorination, the reaction mixture is heated at a temperature of about 100° to 200° C. for about 6 to 24 hours. In a preferred procedure, the reaction mixture is cooled to room temperature and phosphorus pentoxide is added thereto, then the temperature is increased gradually to the temperature used for dehydrochlorination, after which the temperature is increased rapidly to the final reaction temperature.

At the end of the reaction period, the polymer is precipitated from solution by pouring the reaction mixture into a coagulation bath, such as water or methanol.

If a bulk polymer is desired, the reaction mixture is poured directly into the coagulation bath, with or without stirring. The polymer may also be formed into fibers by extruding the polymer/PPA solution through a suitable spinnerette into the coagulation bath or into film by extruding the polymer/PPA solution through a suitable die into the coagulation bath. The resulting fiber or film may be drawn and heat-treated following known procedures.

The concentration of polymer in PPA has some effect in the intrinsic viscosity of the polymer. Intrinsic viscosity is determined by the extrapolation of $\eta$ rel/c and ln $\eta$ rel/c to zero concentration in MSA at 30° C. Generally, the greater the concentration of polymer in PPA, the greater the intrinsic viscosity.

The polymer compositions of the present invention are suitable for spinning into fibers and films. Such fibers and films are suitable substitutes for other inorganic or organic products.

The following examples illustrate the invention:

EXAMPLE I

Model compounds having the structures shown below were synthesized for the purpose of polymer structure verification through comparison of the spectral characteristics of the model compounds and the polymers. These model compounds were as follows:

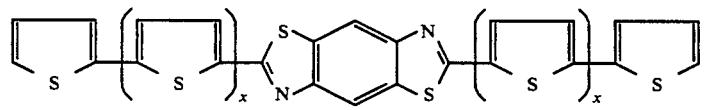

Model compound I (x = 0 or 1)

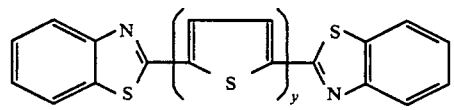

Model compound II (y = 1, 2 or 3)

Model compound I was prepared by the reaction of 2-thiophenecarboxylic acid chloride, 2,5-diamino-1,4-benzenedithiol and, where x is 1, thiophene-2,5-dicarboxylic acid chloride, in PPA at 165° C. for 24 hours. Model compound II was prepared by the reaction of o-aminothiophenol with thiophene-2,5-dicarboxylic acid chloride (y=1), 2,2'-bithiophene-5,5'-dicarboxylic acid chloride (y=2), or 2,2':5',2"-terthiophene-5,5'-dicarboxylic acid chloride (y=3), in PPA at 165° C. for 24 hours. The model compound structures were confirmed by spectroscopic and elemental analysis.

EXAMPLE II

Preparation of poly(thiophene benzobishiazole)
(Polymer I)

A mixture of 100 g of 85% phosphoric acid and 63.3 g of phosphorous pentoxide was stirred under reduced pressure at 100° C. until a homogeneous solution was obtained (77% PPA). To 33.625 g of cooled 77% PPA was added 4.18108 g (20 mmol) thiophene-2,5-dicarboxylic acid chloride and 4.9038 g (20 mmol) 2,5-diamino-1,4-benzenedithiol dihydrochloride. The viscous mixture was slowly heated under a stream of nitrogen with stirring at 40° C. for four hours, at 60° C. for 14 hours, and at 100° C. for four hours to effect dehydrochlorination. Care was taken to control foaming during the dehydrochlorination. After evolution of hydrogen chloride had ceased, the reaction mixture was cooled to room temperature and 11.9672 g $P_2O_5$ was added. The heating schedule used for the dehydrochlorination process was repeated over a period of four hours, then the reaction temperature was quickly raised to 165° C. After 24 hours, the extremely viscous polymerization mixture was cut into small pieces with a scalpel and vigorously stirred in a Waring blendor with water, the subsequently with ammonium hydroxide and water. The resulting slightly fibrous polymer was extracted with water in a continuous extraction apparatus for 24 hours. After being dried at 100° C. in vacuo for two days, 5.39 g (99.08% yield) of slightly fibrous polymer was obtained. This polymer exhibited a dark red color with a metallic blue cast. Intrinsic viscosity 8.1 dl/g in MSA at 30° C. The infrared spectrum of a film of the polymer exhibited absorptions at 1637, 1544 and 1476 cm$^{-1}$. Analysis calculated for $(C_{12}H_4N_2S_3)_n$: C, 52.91; H, 1.48; N, 10.29; S, 35.32. Found: C, 51.87; H, 1.89; N, 9.95; S, 31.90.

This procedure was repeated at different concentrations of polymer in PPA. A comparison of intrinsic viscosity and onset of decomposition vs. concentration is given in Table I, below.

EXAMPLE III

Preparation of poly(bithiophene benzobisthiazole)
(Polymer II)

Polycondensation of 4.107 g (14.106 mmol) of 2,2'-bithiophene-5,5'-dicarboxylic acid chloride and 3.459 g (14.106 mmol) 2,5-diamino-1,4-benzenedithiol dihydrochloride in 44.49 g of 83% PPA (30.96 g of 77% PPA plus 13.53 g $P_2O_5$) provided 4.91 g (98% yield) of polymer which exhibited a reddish color with a metallic green blue. Intrinsic viscosity 4.7 dl/g in MSA at 30° C. The infrared spectrum of a film of the polymer exhibited absorptions at 3067, 1687 and 1405 cm$^{-1}$. Analysis calculated for $(C_{16}H_6N_2S_4)_n$: C, 54.21; H, 1.71; N, 7.90; S, 36.18. Found: C, 53.63; H, 2.12; N, 7.89; S, 31.37.

This procedure was repeated at different concentrations of polymer in PPA. A comparison of intrinsic viscosity and onset of decomposition vs. concentration is given in Table I, below.

EXAMPLE IV

Preparation of poly(terthiophene benzobisthiazole)
Polymer III)

Polycondensation of 2.5644 g (6.871 mmol) of 2,2':5',2"-terthiophene-5,5'-dicarboxylic acid chloride and 1.6847 g (6.871 mmol) of 2,5-diamino-1,4-benzenedithiol dihydrochloride in a solution of 88 g of 77% PPA plus 7.87 g $P_2O_5$ provided 2.91 g (97% yield) of polymer which exhibited a dark red color. Intrinsic viscosity 0.4 dl/g in MSA at 30° C. The infrared spectrum of a film of the polymer exhibited absorptions at 1601, 1557, 1521, 1479 and 1421 cm$^{-1}$. Analysis calculated for $(C_{20}H_8N_2S_5)_n$: C, 55.02; H, 1.85; N, 6.42; S, 36.72. Found: C, 52.74; H, 2.07; N, 6.23; S, 34.92.

All the polymers prepared above were soluble in MSA and sulfuric acid. Films cast from Polymers I and II in MSA solution exhibited toughness and transparency. Ultraviolet spectra of these films displayed maximum absorptions in the range of 287-591 nm (Polymer I) and 232-991 nm (Polymer II).

The chemical structures of the polymers were substantiated by elemental analysis and comparison of infrared spectra with those of the model compounds. Infrared spectra of Polymer I films cast from MSA displayed two strong absorptions at 1544 and 1476 cm$^{-1}$, attributable to the benzothiazole structure.

The thermal behavior of the polymers was studied by thermogravimetric analysis (TGA) in air, thermogravimetric-mass spectral analysis (TG/MS) and differential scanning calorimetry (DSC). Onset of breakdown under TGA in air is shown in Table I. DSC gave no indication of a glass transition temperature for any of the polymers.

TABLE I

| Polymer | Conc (wt %) | [η] (dl/g) | TGA onset |
|---------|-------------|------------|-----------|
| I       | 2.0         | 0.8        | 588° C.   |
|         | 8.8         | 4.5        |           |
|         | 10.0        | 8.1        |           |
|         | 12.0        | 4.6        |           |
| II      | 8.0         | 2.9        | 541° C.   |
|         | 10.0        | 4.7        |           |
|         | 12.0        | 2.4        |           |
| III     | 10.0        | 0.4        | 459° C.   |

Evaluation of the third-order optical properties of Polymer I indicate a chi$^{(3)}$ value of $4.5 \times 10^{-10}$ esu.

Various modifications may be made to the invention as described without departing from the spirit of the invention or the scope of the appended claims.

We claim:

1. A benzobisthiazole polymer having repeating units of the formula:

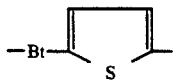

wherein Bt is

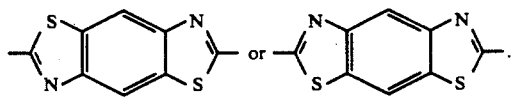

2. A benzobisthiazole polymer having repeating units of the formula:

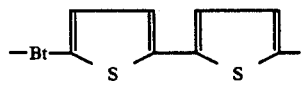

wherein Bt is

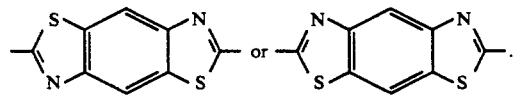

3. A benzobisthiazole polymer having repeating units of the formula:

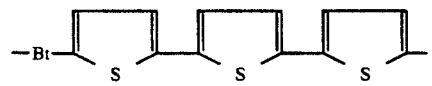

wherein Bt is

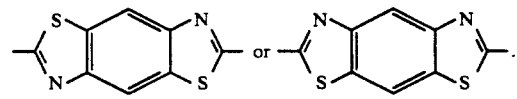

* * * * *